United States Patent
Munakata et al.

(10) Patent No.: US 12,551,926 B2
(45) Date of Patent: Feb. 17, 2026

(54) ULTRASONIC HORN

(71) Applicant: Yamaha Robotics Co., Ltd., Tokyo (JP)

(72) Inventors: Hiroshi Munakata, Tokyo (JP); Takuya Adachi, Tokyo (JP)

(73) Assignee: Yamaha Robotics Co., Ltd., Tokyo (JP)

( * ) Notice: Subject to any disclaimer, the term of this patent is extended or adjusted under 35 U.S.C. 154(b) by 772 days.

(21) Appl. No.: 17/921,627

(22) PCT Filed: Feb. 10, 2021

(86) PCT No.: PCT/JP2021/004918
§ 371 (c)(1),
(2) Date: Oct. 26, 2022

(87) PCT Pub. No.: WO2022/172352
PCT Pub. Date: Aug. 18, 2022

(65) Prior Publication Data
US 2023/0173541 A1 Jun. 8, 2023

(51) Int. Cl.
*B06B 1/06* (2006.01)
(52) U.S. Cl.
CPC .................................. *B06B 1/06* (2013.01)
(58) Field of Classification Search
CPC ..... B06B 1/06; B06B 2201/55; B06B 1/0611; B06B 3/00
See application file for complete search history.

(56) References Cited

U.S. PATENT DOCUMENTS 3,773,240 A * 11/1973 Heim ................. B23K 11/0026
    29/748
3,941,294 A * 3/1976 Johannsmeier ......... B23Q 1/48
    228/6.2
(Continued)

FOREIGN PATENT DOCUMENTS

CN   101804575   8/2010
CN   105246623   1/2016
(Continued)

OTHER PUBLICATIONS

"Office Action of China Counterpart Application", issued on Jul. 26, 2023, with partial English translation thereof, p. 1-p. 13.
(Continued)

*Primary Examiner* — Pedro J Cuevas
(74) *Attorney, Agent, or Firm* — JCIPRNET

(57) ABSTRACT

An ultrasonic horn includes: a vertical vibration generating portion in which a first ultrasonic vibrator is mounted inside; a horn portion extending forward from the vertical vibration generating portion, amplifying an ultrasonic vibration generated by the vertical vibration generating portion, and to which a capillary is mounted at a front end portion; and a torsional vibration generating portion extending rearward from the vertical vibration generating portion. The torsional vibration generating portion includes: a rod-shaped body; vibration members arranged axisymmetrically around a central axis; second ultrasonic vibrators sandwiched between the rod-shaped body and the vibration members such that a vibration direction is a circumferential direction; and bolts pressurizing the second ultrasonic vibrators.

7 Claims, 9 Drawing Sheets

(56) References Cited

U.S. PATENT DOCUMENTS

| | | | |
|---|---|---|---|
| 4,475,681 A * | 10/1984 | Ingle | H01L 24/78 228/180.5 |
| 5,603,445 A * | 2/1997 | Hill | H01L 24/78 228/904 |
| 5,730,832 A * | 3/1998 | Sato | B29C 66/8322 156/499 |
| 5,906,694 A * | 5/1999 | Duly | B23K 20/12 156/580.2 |
| 6,286,747 B1 * | 9/2001 | Chan | H01L 24/78 228/110.1 |
| 6,382,494 B1 * | 5/2002 | Miller | H01L 24/85 228/110.1 |
| 7,565,994 B2 | 7/2009 | Kondo | |
| 8,251,275 B2 | 8/2012 | Deangelis et al. | |
| 8,365,977 B2 | 2/2013 | Deangelis et al. | |
| 9,981,321 B2 | 5/2018 | Feucht et al. | |
| 11,491,511 B2 * | 11/2022 | Akagane | B06B 1/06 |
| 11,691,214 B2 * | 7/2023 | Munakata | H01L 24/85 228/1.1 |
| 12,046,574 B2 * | 7/2024 | Ito | B23K 20/10 |
| 2004/0035912 A1 * | 2/2004 | Li | B23K 20/106 228/110.1 |
| 2012/0065578 A1 | 3/2012 | Zhou | |
| 2018/0318878 A1 * | 11/2018 | Akagane | A61B 17/29 |
| 2023/0125043 A1 * | 4/2023 | Munakata | H01L 24/78 228/1.1 |

FOREIGN PATENT DOCUMENTS

| | | | | |
|---|---|---|---|---|
| CN | 108472688 A | * | 8/2018 | A61B 17/29 |
| CN | 108472688 B | * | 3/2020 | A61B 17/29 |
| CN | 115427161 A | * | 12/2022 | B06B 1/06 |
| CN | 116438638 A | * | 7/2023 | B23K 20/005 |
| CN | 109175415 B | * | 5/2024 | B23B 25/00 |
| EP | 3406354 A1 | * | 11/2018 | B06B 1/0611 |
| EP | 3406354 B1 | * | 2/2023 | B06B 1/06 |
| JP | H01148081 | | 6/1989 | |
| JP | H05146172 | | 6/1993 | |
| JP | H06286401 | | 10/1994 | |
| JP | 2005236136 | | 9/2005 | |
| JP | 2005319769 | | 11/2005 | |
| JP | 2016524547 | | 8/2016 | |
| JP | 6180736 | | 8/2017 | |
| JP | 6192886 B1 | * | 9/2017 | B06B 1/0611 |
| JP | WO2017126032 A1 | * | 1/2018 | A61B 17/320092 |
| JP | 7349765 B2 | * | 9/2023 | B23K 20/005 |
| JP | 7429465 B2 | * | 2/2024 | B06B 1/0611 |
| KR | 1020100106202 | | 10/2010 | |
| KR | 1020170044350 | | 4/2017 | |
| KR | 20230093485 A | * | 6/2023 | B23K 20/233 |
| KR | 20230129550 A | * | 9/2023 | B06B 1/0611 |
| SG | 165224 | | 10/2010 | |
| WO | WO-2017126032 A1 | * | 7/2017 | B06B 3/00 |
| WO | WO-2022172352 A1 | * | 8/2022 | B06B 1/06 |
| WO | WO-2023063431 A1 | * | 4/2023 | H01L 24/78 |

OTHER PUBLICATIONS

"International Search Report (Form PCT/ISA/210) of PCT/JP2021/004918," mailed on Apr. 13, 2021, with English translation thereof, pp. 1-4.

"Office Action of Korea Counterpart Application", issued on Feb. 19, 2025, with English translation thereof, p. 1-p. 13.

* cited by examiner

ULTRASONIC HORN

CROSS-REFERENCE TO RELATED APPLICATION

This application is a 371 application of the International PCT application serial no. PCT/JP2021/004918, filed on Feb. 10, 2021. The entirety of the above-mentioned patent application is hereby incorporated by reference herein and made a part of this specification.

TECHNICAL FIELD

The present invention relates to an ultrasonic horn that ultrasonically vibrates a bonding tool mounted to a tip.

RELATED ART

A wire bonding apparatus is often used to connect an electrode of a semiconductor die and a lead of a lead frame using a wire. After bonding the wire and the electrode by ultrasonically vibrating a capillary with the wire pressed onto the electrode by the capillary, the wire bonding apparatus stretches the wire to the lead, and with the stretched wire pressed onto the lead, and applies ultrasonic vibrations to the capillary to bond the wire and the lead.

On the other hand, in order to improve the bonding quality and the bonding strength, a method of vibrating the tip of the bonding tool in multiple directions has been proposed. For example, Patent Literature 1 proposes a method in which an ultrasonic vibrator, stacked with piezoelectric elements in which two regions separated by a notch portion in a direction parallel to an electrode surface are formed, is mounted to an ultrasonic horn, and electric power of different frequencies is supplied to each region of the piezoelectric elements to vibrate the tip of a bonding tool mounted to the ultrasonic horn in multiple direction so as to generate a scrubbing motion.

CITATION LIST

Patent Literature

[Patent Literature 1] Japanese Patent No. 6180736

SUMMARY OF INVENTION

Technical Problem

However, since the method described in Patent Literature 1 uses a special ultrasonic vibrator, there has been a problem that the structure and driving device of the ultrasonic vibrator become complicated.

Therefore, the present invention provides an ultrasonic horn that vibrates the bonding tool mounted to the tip in multiple directions with a simple structure.

Solution to Problem

The ultrasonic horn of the present invention includes a vertical vibration generating portion in which a first ultrasonic vibrator is mounted inside such that a vibration direction is a front-rear direction; a horn portion extending forward from the vertical vibration generating portion, amplifying an ultrasonic vibration generated by the vertical vibration generating portion, and to which a bonding tool is mounted at a front end portion; and a torsional vibration generating portion extending rearward from the vertical vibration generating portion. The torsional vibration generating portion includes a rod-shaped body extending rearward from the vertical vibration generating portion; a pair of vibration members arranged axisymmetrically around a longitudinal central axis of the rod-shaped body and having a mass smaller than the rod-shaped body; a pair of second ultrasonic vibrators axisymmetric around the longitudinal central axis of the rod-shaped body and sandwiched between the rod-shaped body and each of the vibration members such that a vibration direction is a circumferential direction; and a pair of pressurizing mechanisms compressing each of the second ultrasonic vibrators sandwiched between the rod-shaped body and each of the vibration members and pressurizing each of the second ultrasonic vibrators.

As a result, by ultrasonically vibrating the first ultrasonic vibrator the tip of the bonding tool in the front-rear direction of the ultrasonic horn by the first ultrasonic vibrator by generating torsional vibration in the torsional vibration generating portion by the second ultrasonic vibrator generates, the tip of the bonding tool may be ultrasonically vibrated in a lateral direction orthogonal to the front-rear direction.

In the ultrasonic horn of the present invention, the rod-shaped body has a pair of notch portions formed axisymmetrically around the longitudinal central axis, each of the vibration members is a separate member from the rod-shaped body and is fitted into each of the notch portions, and the pressurizing mechanism may be a bolt screwed into the rod-shaped body or the vibration member and compressing the second ultrasonic vibrator sandwiched between the rod-shaped body and the vibration member.

Since the vibration member is a separate member from the rod-shaped body, and the second ultrasonic vibrator is sandwiched between them and fastened with a bolt, the overall configuration can be simplified.

In the ultrasonic horn of the present invention, each of the vibration members is a portion partitioned by slits provided axisymmetrically around the longitudinal central axis of the rod-shaped body and extending radially, and a part thereof is respectively connected to the rod-shaped body; the pair of second ultrasonic vibrators are respectively arranged in each recess portion between the rod-shaped body and each of the vibration members; and the pressurizing mechanism is a wedge inserted between the second ultrasonic vibrator in the recess portion and the rod-shaped body or between the second ultrasonic vibrator and the vibration member.

Since the vibration member is partitioned by the slits, the number of parts can be reduced and the structure can be simplified.

In the ultrasonic horn of the present invention, the second ultrasonic vibrator may be configured by stacking a plurality of piezoelectric elements that vibrate in a thickness direction when a high frequency power is applied.

As a result, the tip of the bonding tool may be ultrasonically vibrated in the lateral direction without using a special piezoelectric element.

Effects of Invention

The present invention is capable of providing an ultrasonic horn that vibrates a bonding tool mounted to the tip in multiple direction with a simple structure.

DESCRIPTION OF EMBODIMENTS

Figure 1:
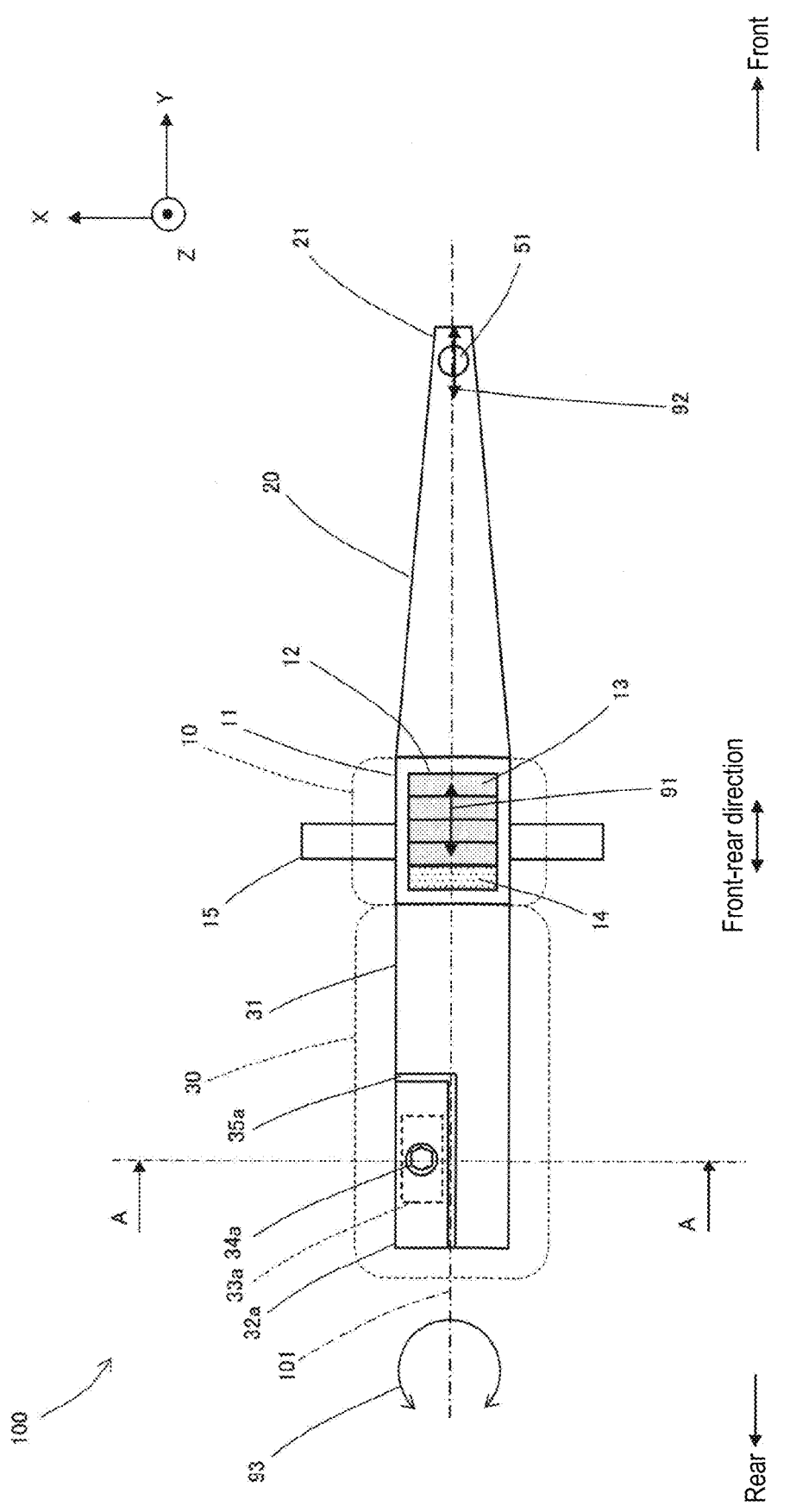
FIG. 1 is a plan view of an ultrasonic horn according to an embodiment.

Hereinafter, an ultrasonic horn 100 of the embodiment will be described with reference to the drawings. As shown in FIG. 1, the ultrasonic horn 100 includes a vertical vibration generating portion 10, a horn portion 20, and a torsional vibration generating portion 30. In the following description, the extending direction of a longitudinal central axis 101 of the ultrasonic horn 100 is taken as a Y direction or the front-rear direction, the direction perpendicular to the Y direction in the horizontal plane is taken as an X direction or a lateral direction, and the up-and-down direction is taken as a Z direction. Further, the side of the horn portion 20 will be described as the front or the positive side in the Y direction, and the side of the torsional vibration generating portion 30 will be described as the rear or the negative side in the Y direction. The central axis 101 is a virtual axis.

The vertical vibration generating portion 10 is includes a casing 11, a first ultrasonic vibrator 13, and a wedge 14.

The casing 11 is made of metal such as titanium and has an opening 12 in a center for accommodating the first ultrasonic vibrator 13. Further, on an outer surface of the casing 11, a mounting arm 15 extending respectively in the positive side in the X direction and the negative side in the X direction is provided.

The first ultrasonic vibrator 13 is configured by stacking a plurality of piezoelectric elements such as a piezoelectric element that vibrates in the thickness direction when a voltage is applied. The first ultrasonic vibrator 13 is mounted in the opening 12 of the casing 11 such that the stacking direction, which is the vibration direction, is the front-rear direction. Then, the wedge 14 is inserted between a rear end surface of the opening 12 and a rear end surface of the first ultrasonic vibrator 13. The wedge 14 compresses the first ultrasonic vibrator 13 in the front-rear direction and applies a pressurization in the front-rear direction to the first ultrasonic vibrator 13.

Figure 2:
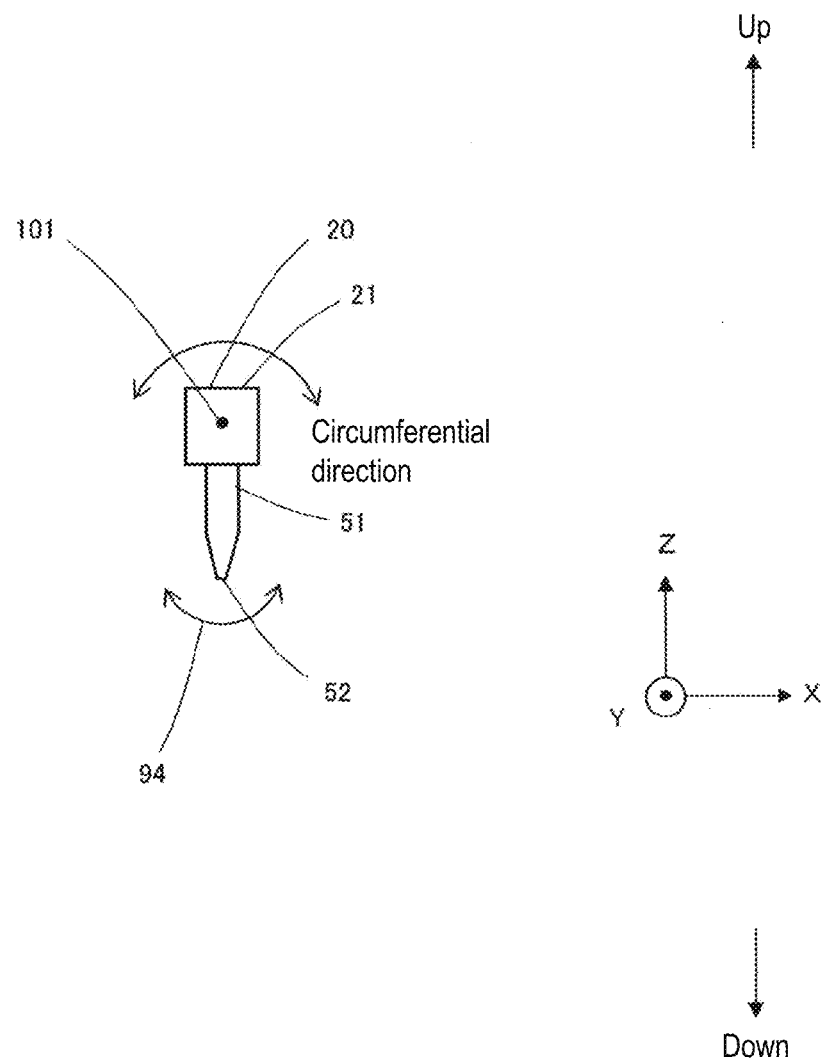
FIG. 2 is an elevation view showing a front end portion of an ultrasonic horn according to an embodiment.

The horn portion 20 is a portion that extends forward from the casing 11 of the vertical vibration generating portion 10 and amplifies the ultrasonic vibration in the front-rear direction generated by the vertical vibration generating portion 10. The horn portion 20 is made of metal integrally formed with the casing 11 of the vertical vibration generating portion 10, and its width or diameter decreases from a root portion connected to the front end of the casing 11 toward a front end portion 21. As shown in FIG. 2, a capillary 51, which is a bonding tool, is mounted to the front end portion 21 of the horn portion 20.

Figure 3:
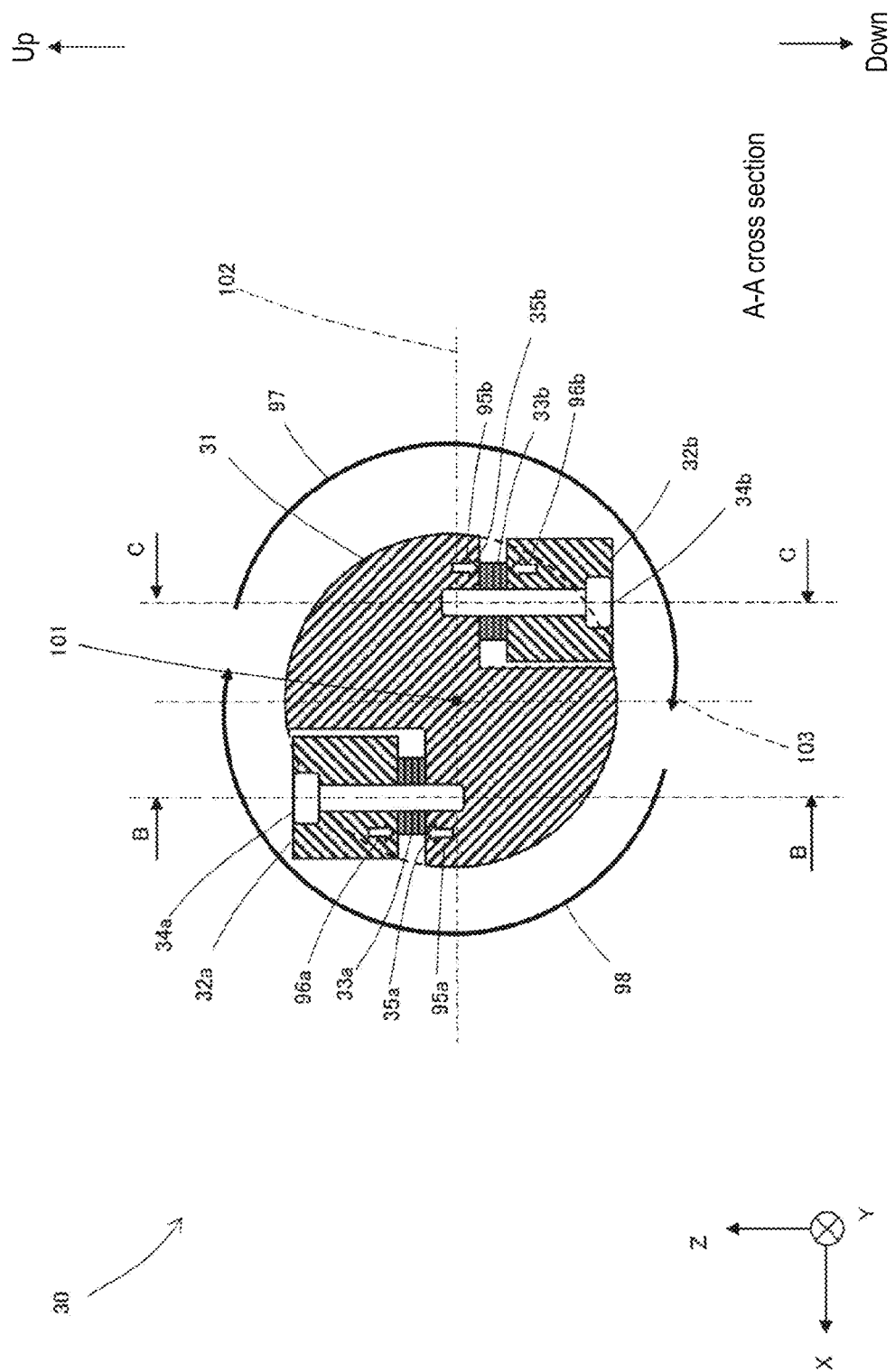
FIG. 3 is an axial cross-sectional view of a torsional vibration generating portion of an ultrasonic horn according to an embodiment, and is cross section A-A shown in FIG. 1.

As shown in FIG. 1 and FIG. 3, the torsional vibration generating portion 30 includes a rod-shaped body 31, a pair of vibration members 32a and 32b, a pair of second ultrasonic vibrators 33a and 33b, and a pair of bolts 34a and 34b as a pair of pressurizing mechanisms. In FIG. 3, an alternate long and short dash line 102 is a line extending horizontally through the central axis 101, and an alternate long and short dash line 103 is a line extending in the up-and-down direction or the Z direction through the central axis 101. The alternate long and short dash lines 102 and 103 are virtual lines for indicating the position of the central axis 101. The same applies to FIG. 7.

The rod-shaped body 31 is a columnar metal member extending rearward from the rear end of the casing 11 of the vertical vibration generating portion 10, and is integrally formed with the casing 11 and the horn portion 20. The rod-shaped body 31 is formed with a pair of notch portions 35a and 35b at the rear end portion having a fan-shaped cross-section and extending longitudinally. As shown in FIG. 3, the pair of notch portions 35a and 35b are formed so as to be axisymmetric around the longitudinal central axis 101 of the rod-shaped body 31. The longitudinal central axis 101 of the rod-shaped body 31 is the same as the longitudinal central axis 101 of the entire ultrasonic horn 100 described with reference to FIG. 1, and is an axis extending in the Y direction or the front-rear direction.

Figure 4:
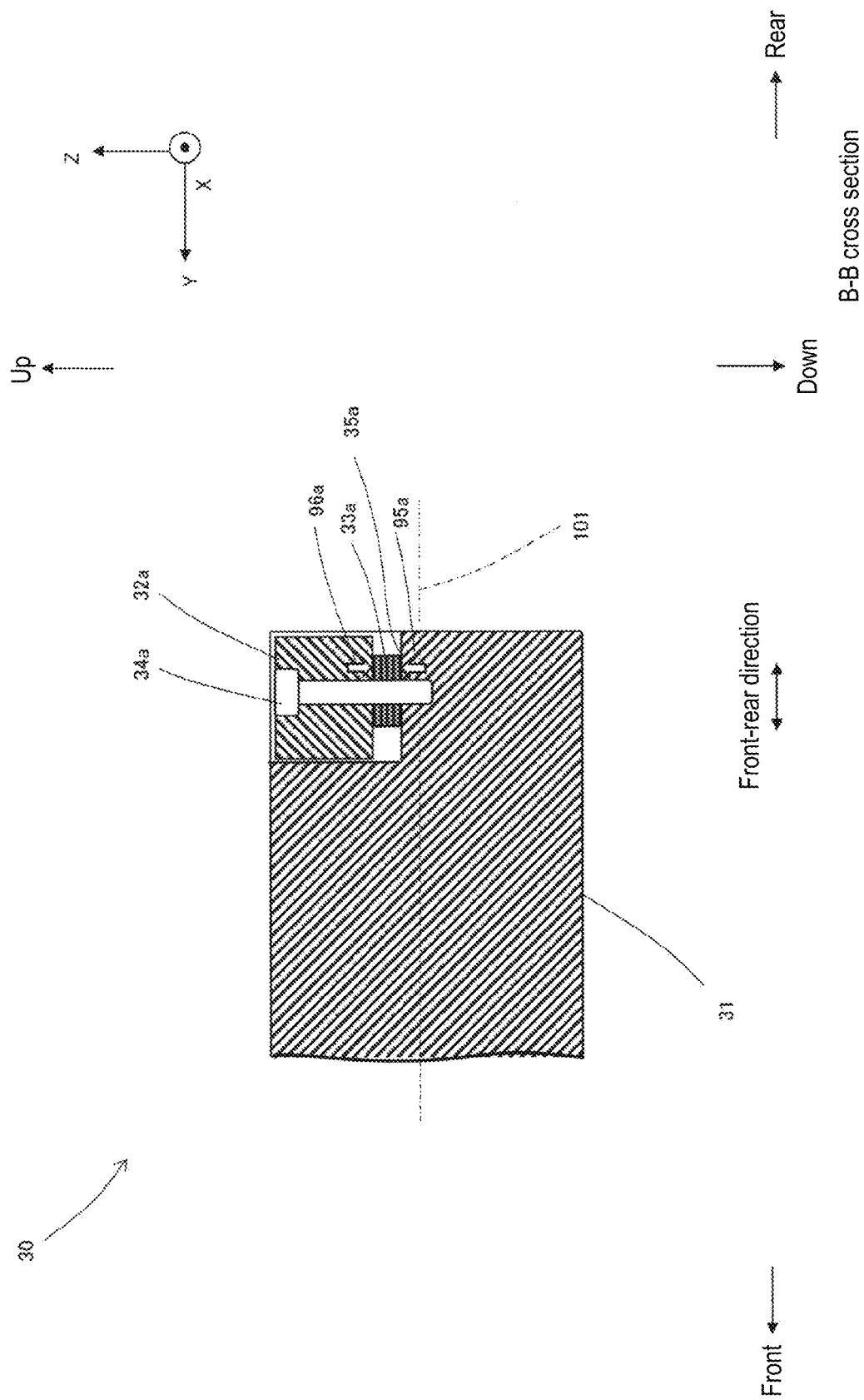
FIG. 4 is a longitudinal cross-sectional view of a torsional vibration generating portion of an ultrasonic horn according to an embodiment, and is a B-B cross section shown in FIG. 3.

As shown in FIG. 3 and FIG. 4, one second ultrasonic vibrator 33a is arranged on an upper surface of one notch portion 35a. The one second ultrasonic vibrator 33a is configured by stacking a plurality of piezoelectric elements such as a piezoelectric element that ultrasonically vibrates in the thickness direction when a high frequency power is applied. The one second ultrasonic vibrator 33a is arranged on the one notch portion 35a such that the stacking direction of the piezoelectric elements, which is the vibration direction, is the circumferential direction.

One vibration member 32a is arranged on the one second ultrasonic vibrator 33a. The one vibration member 32a is a columnar member having a square cross-section, and is fitted into the one notch portion 35a. The one vibration member 32a is a member made of metal and has a mass smaller than the rod-shaped body 31. Further, the vibration member 32a is a separate member from the rod-shaped body 31.

The one vibration member 32a is fixed to the rod-shaped body 31 together with the one second ultrasonic vibrator 33a by screwing a male screw portion of one bolt 34a, which passes through a hole provided in the one vibration member 32a and a hole provided in the one second ultrasonic vibrator 33a, into a female screw portion of the rod-shaped body 31. Therefore, when the one bolt 34a is used to fix the one vibration member 32a and the one second ultrasonic vibrator 33a to the one notch portion 35a of the rod-shaped body 31, the one bolt 34a pressurizes the one second ultrasonic vibrator 33a by compressing the one second ultrasonic vibrator 33a sandwiched between the one notch portion 35a of rod-shaped body 31 and the one vibration member 32a, as indicated by arrows 95a and 96a. In this way, the one second ultrasonic vibrator 33a is pressurized in the circumferential direction.

Figure 5:
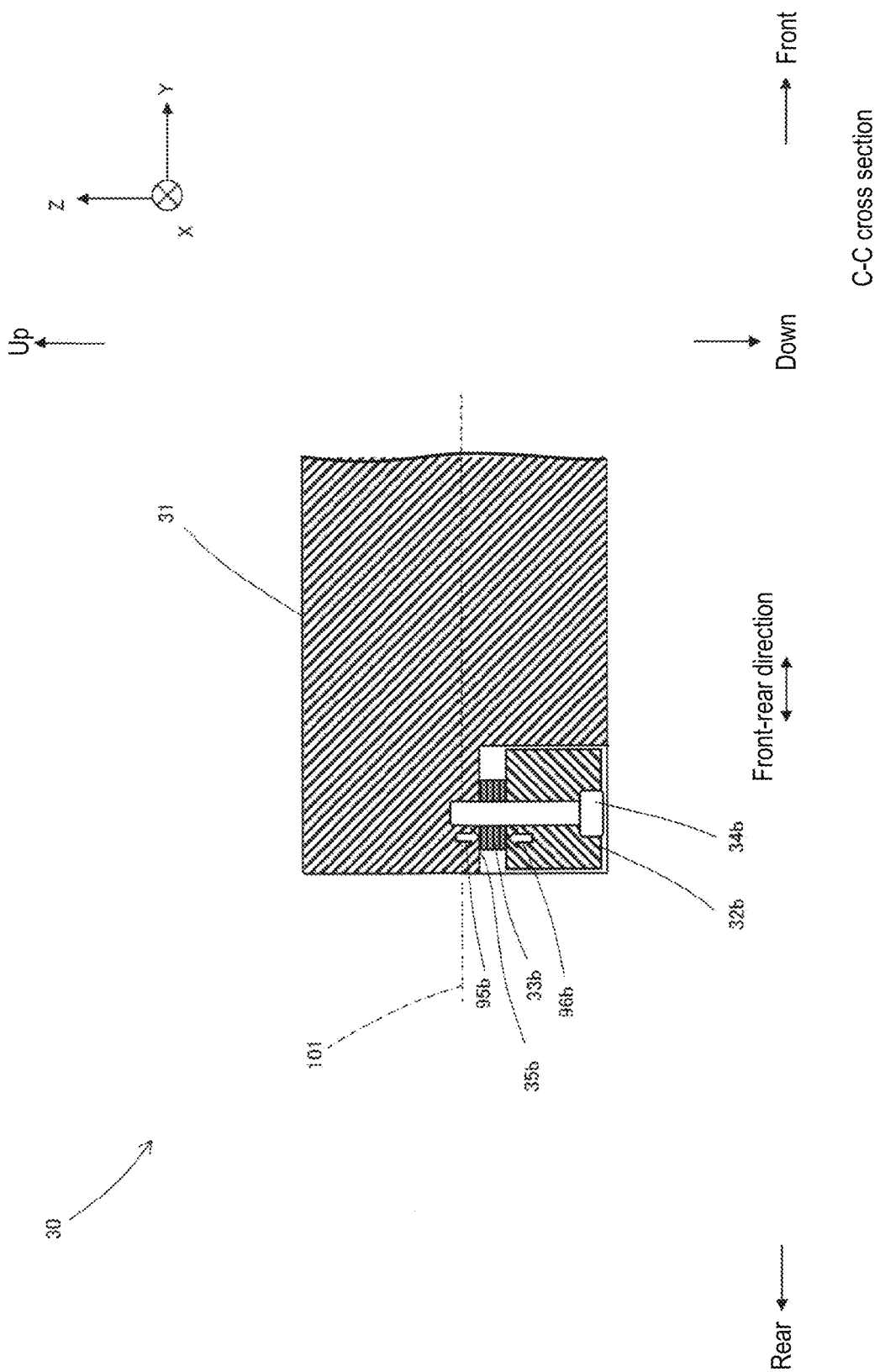
FIG. 5 is a longitudinal cross-sectional view of a torsional vibration generating portion of an ultrasonic horn according to an embodiment, and is a C-C cross section shown in FIG. 3.

As shown in FIG. 3 and FIG. 5, the other notch portion 35b is formed axisymmetrically around the central axis 101 with the one notch portion 35a. The other second ultrasonic vibrator 33b and the other vibration member 32b are fixed by the other bolt 34b on a lower surface, similar to the one second ultrasonic vibrator 33a, the one vibration member 32a, and the one bolt 34a. Here, the other second ultrasonic vibrator 33b, the other vibration member 32b, and the other bolt 34b have the same structure as the one second ultrasonic vibrator 33a, the one vibration member 32a, and the one bolt 34a, respectively.

Thus, the other second ultrasonic vibrator 33b, the other vibration member 32b, and the other bolt 34b are arranged axisymmetrically around the central axis 101 with the one second ultrasonic vibrator 33a, the one vibration member 32a, and the one bolt 34a, respectively. Further, the other second ultrasonic vibrator 33b is compressed and pressurized in the circumferential direction as shown by arrows 95b and 96b in FIG. 3 and FIG. 5.

Next, the operation of the ultrasonic horn 100 configured as described above will be described. When a high frequency power is applied to the first ultrasonic vibrator 13, the first ultrasonic vibrator 13 ultrasonically vibrates in the front-rear direction as shown by an arrow 91 in FIG. 1. The horn portion 20 amplifies the ultrasonic vibration in the front-rear direction generated by the vertical vibration generating portion 10 and causes the front end portion 21 to be ultrasonically vibrated in the front-rear direction as shown by an arrow 92 in FIG. 1. As a result, a tip 52 (see FIG. 2) of the capillary 51 ultrasonically vibrates in the front-rear direction.

Further, when a high frequency power is applied to the one second ultrasonic vibrator 33a, the one second ultrasonic vibrator 33a ultrasonically vibrates in the circumferential direction. This ultrasonic vibration is transmitted to the rod-shaped body 31 and the one vibration member 32a sandwiching the one second ultrasonic vibrator 33a. Since the one vibration member 32a has a mass smaller than the rod-shaped body 31, the one vibration member 32a ultrasonically vibrates with respect to the rod-shaped body 31 in the circumferential direction.

Similarly, when high-frequency power is applied to the other second ultrasonic vibrator 33b, the other second ultrasonic vibrator 33b ultrasonically vibrates, and the other vibration member 32b ultrasonically vibrates with respect to the rod-shaped body 31 in the circumferential direction.

Since the one vibration member 32a and the other vibration member 32b are arranged axisymmetrically with respect to the central axis 101, the pair of vibration members 32a and 32b vibrate axisymmetrically with respect to the central axis 101 in the circumferential direction. Further, since the phase and magnitude of the high frequency power applied to the pair of second ultrasonic vibrators 33a and 33b are the same, as shown by arrows 97 and 98 in FIG. 3, a torsional moment in the same direction around the central axis 101 is applied to the rod-shaped body 31 by the vibration of the pair of vibration members 32a and 32b in the circumferential direction. As a result, the rod-shaped body 31 ultrasonically vibrates around the central axis 101 in a torsional direction as shown by an arrow 93 in FIG. 1.

This torsional vibration is transmitted from the rod-shaped body 31 to the casing 11 and causes the horn portion 20 to torsionally vibrate around the central axis 101. As a result, as shown by an arrow 94 in FIG. 2, the tip 52 of the capillary 51 mounted at the front end portion 21 of the horn portion 20 vibrates in the X direction or the lateral direction.

As described above, by the ultrasonic vibration of the first ultrasonic vibrator 13 and ultrasonic vibration of the second ultrasonic vibrators 33a and 33b, the ultrasonic horn 100 is capable of causing the vibrate the tip 52 of the capillary 51 mounted to the front end portion 21 of the horn portion 20 vibrate in two directions, the Y direction which is the front-rear direction and the X direction which is the lateral direction. As a result, the bonding quality and the bonding strength of the wire bonding portion can be improved.

Further, in the torsional vibration generating portion 30 of the ultrasonic horn 100 the pair of notch portions 35a and 35b are formed axisymmetrically with respect to the central axis 101 of the rod-shaped body 31, and the pair of vibration members 32a and 32b, the pair of second ultrasonic vibrators 33a and 33b, and the pair of bolts 34a and 34b are mounted to the pair of notch portions 35a and 35b so as to be axisymmetric with respect to the central axis 101, therefore the rod-shaped body 31 is stably torsionally vibrated around the central axis 101. Therefore, the ultrasonic horn 100 may suppress vibration components other than torsional vibration such as lateral vibration, and may stably ultrasonically vibrate the tip 52 of the capillary 51 in the X direction.

Moreover, since the second ultrasonic vibrators 33a and 33b are configured by stacking a plurality of general piezoelectric elements such as piezoelectric elements that ultrasonically vibrate in the thickness direction when a high-frequency power is applied, there is no need to use a special piezoelectric element, and costs can be reduced.

Further, in the ultrasonic horn 100, the second ultrasonic vibrators 33a and 33b are compressed and pressurized by the bolts 34a and 34b, therefore the pressurization load can be freely adjusted, and the ultrasonic vibration of the second ultrasonic vibrators 33a and 33b can be stabilized.

Moreover, in the above description, although the phase and magnitude of the high frequency power applied to the pair of second ultrasonic vibrators 33a and 33b are described as being the same, the phase and magnitude of the high frequency power applied to the pair of second ultrasonic vibrators 33a and 33b may be slightly shifted in consideration of the dimensional deviation of each part of the ultrasonic horn 100. In this case, the phase and the amount of deviation in size may be determined by a test or the like.

Further, the one vibration member 32a includes a female screw portion and may be fixed to the rod-shaped body 31 by passing the one bolt 34a through a hole provided in the rod-shaped body 31 and a hole provided in the one second ultrasonic vibrator 33a and screwing the male screw portion of the one bolt 34a into the female screw portion of the one vibration member 32a. The same applies to the other vibration member 32b.

Next, an ultrasonic horn 200 according to another embodiment will be described with reference to FIGS. 6-9, and parts that are the same of the ultrasonic horn 100 described above with reference to FIGS. 1-5 are given the same reference numerals, and the description thereof will be omitted.

Figure 6:
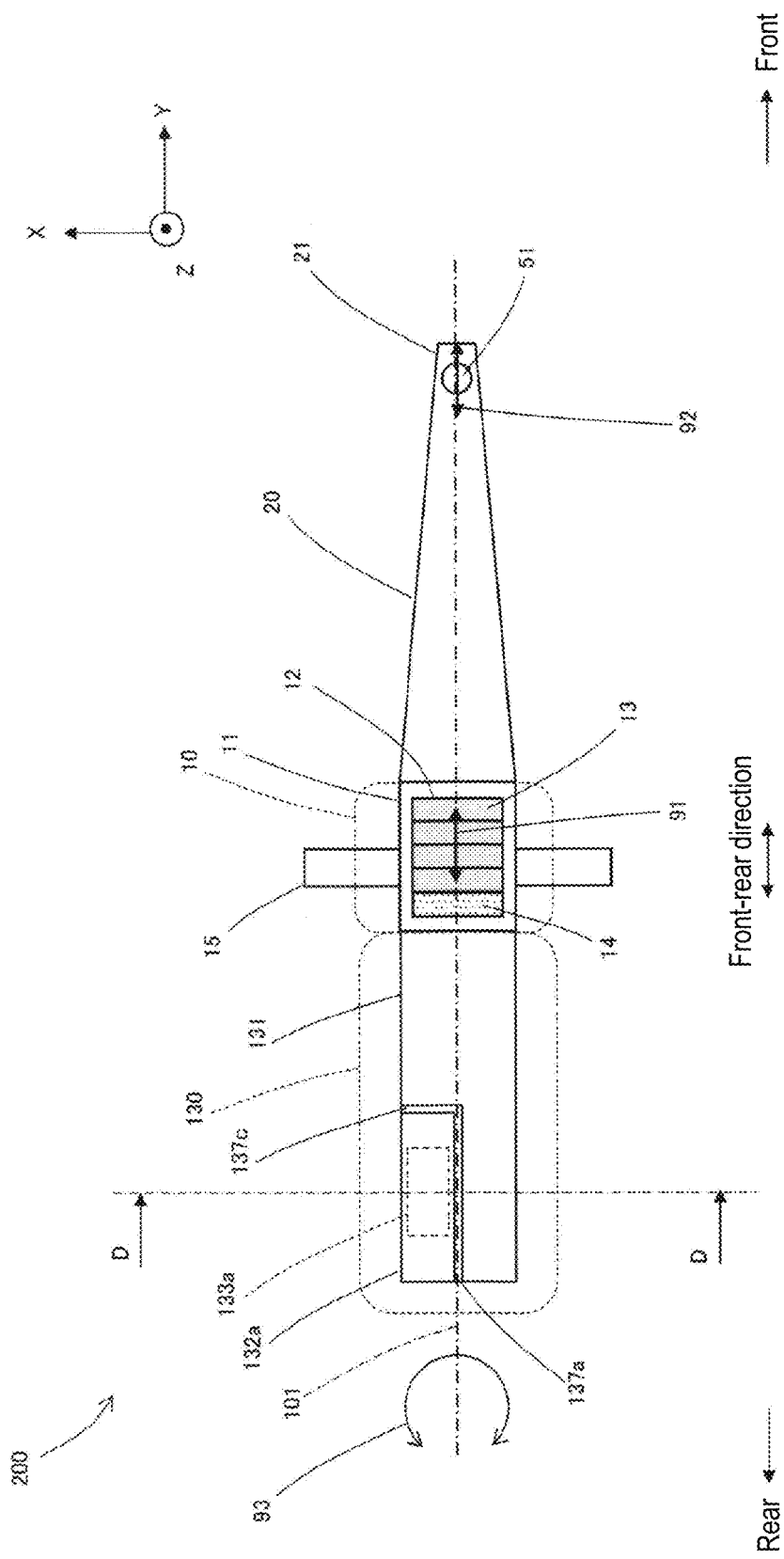
FIG. 6 is a plan view of an ultrasonic horn according to another embodiment.
Figure 7:
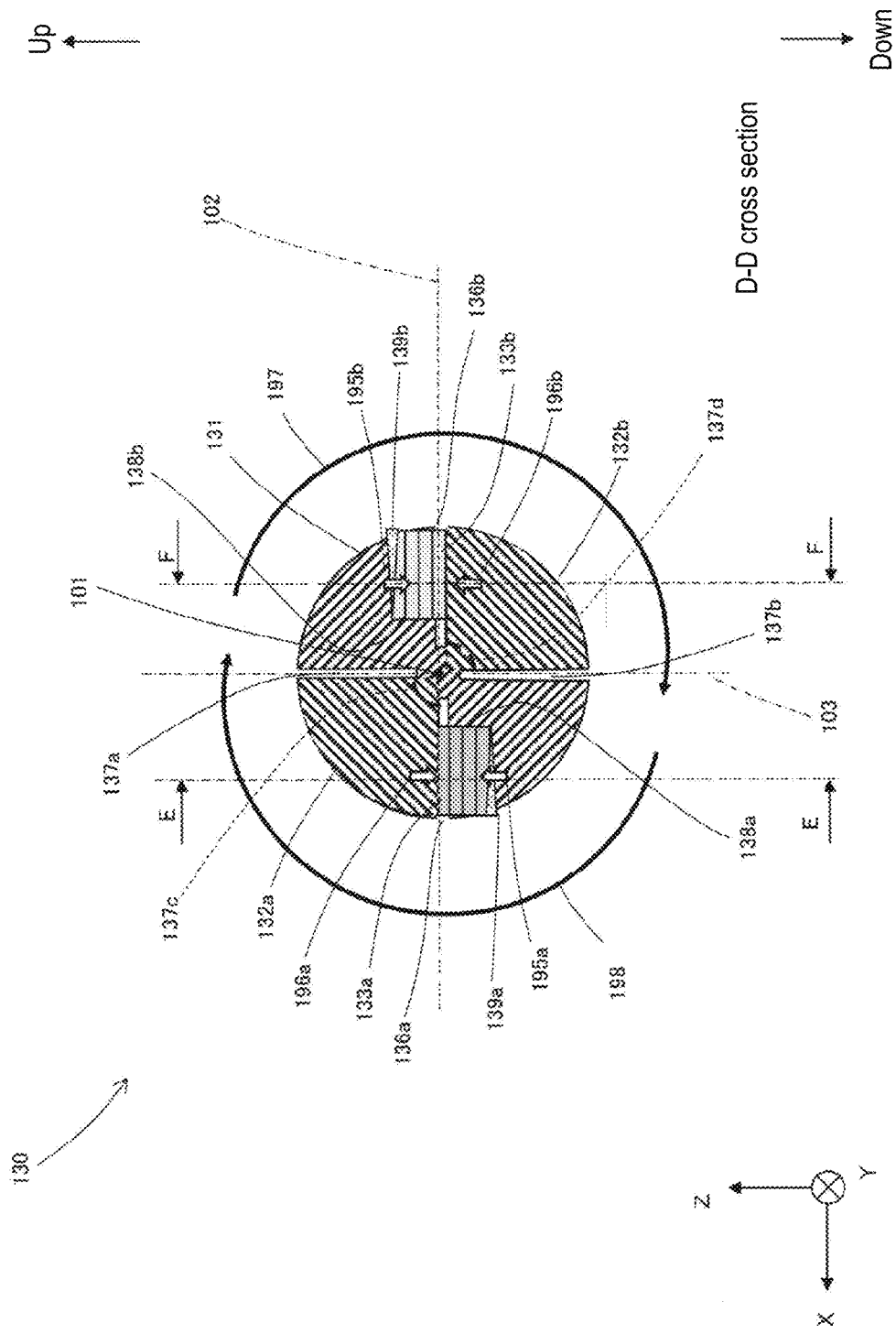
FIG. 7 is an axial cross-sectional view of a torsional vibration generating portion of an ultrasonic horn according to another embodiment, and is a D-D cross section shown in FIG. 6.
Figure 8:
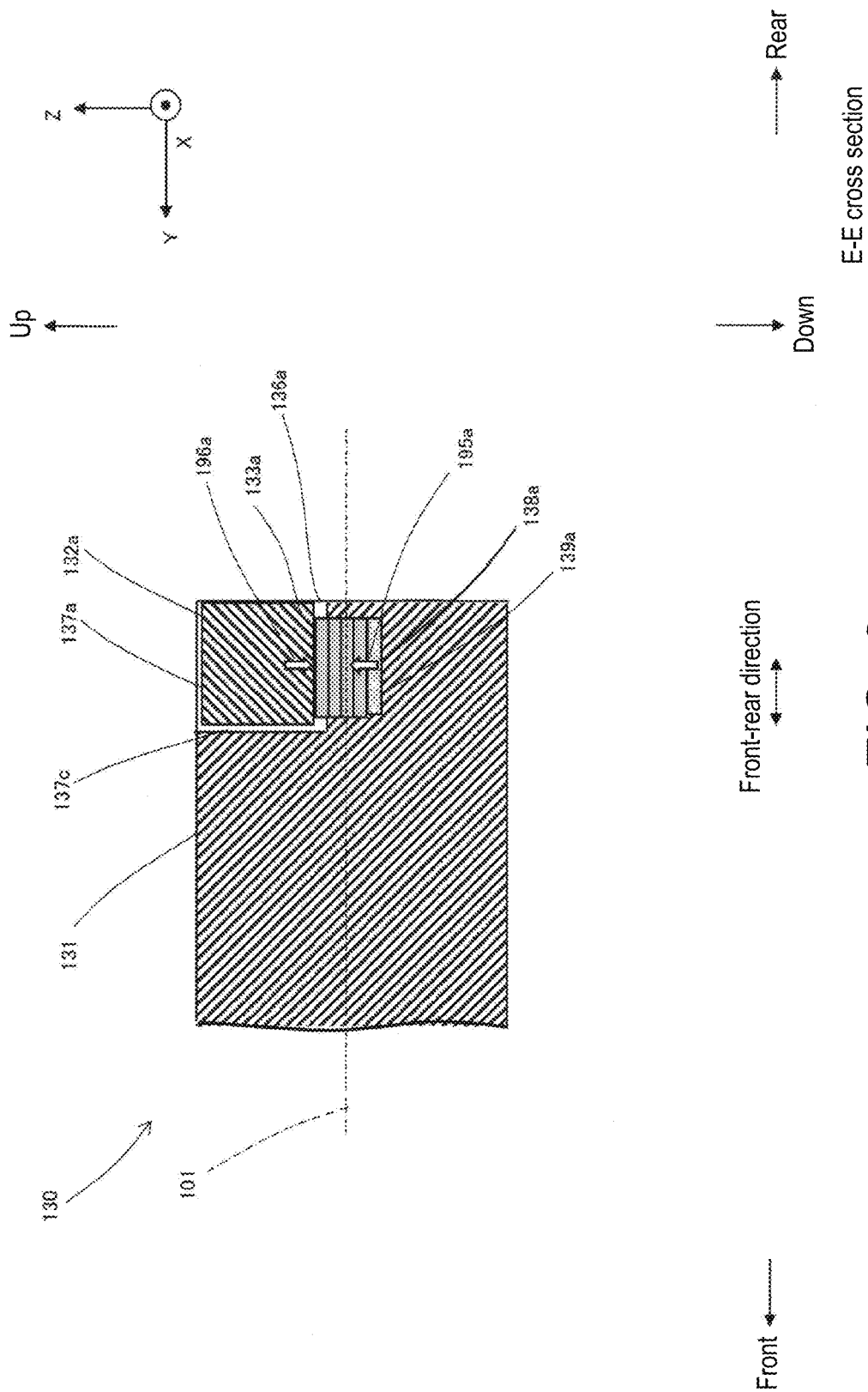
FIG. 8 is a longitudinal cross-sectional view of a torsional vibration generating portion of an ultrasonic horn according to another embodiment, and is E-E cross section shown in FIG. 7.

As shown in FIGS. 6-8, the rod-shaped body 131 provided in a torsional vibration generating portion 130 is provided with a pair of horizontal slits 136a and 136b, a pair of vertical slits 137a and 137b, and a pair of fan-shaped slits 137c and 137d. One horizontal slit 136a and the other horizontal slit 136b are slits that extend horizontally and radially outward from a central portion of the rod-shaped body 131. One vertical slit 137a is a slit formed from a rear end surface of the rod-shaped body 131 to a longitudinal center and extending radially outward upward from the central portion. The other vertical slit 137b is a slit formed from the rear end surface of the rod-shaped body 131 to the longitudinal center and extending radially outward downward from the central portion. One fan-shaped slit 137c is a slit that spreads in a fan shape diagonally upward from the central portion at the longitudinal center of the rod-shaped body 131. The other fan-shaped slit 137d is a slit that spreads in a fan shape diagonally downward from the central portion at the longitudinal center of the rod-shaped body 131.

The one horizontal slit 136a, the one vertical slit 137a, and the one fan-shaped slit 137c are arranged axisymmetrically with respect to the other horizontal slit 136b, the other vertical slit 137b, and the other fan-shaped slit 137d with respect to the central axis 101.

Figure 9:
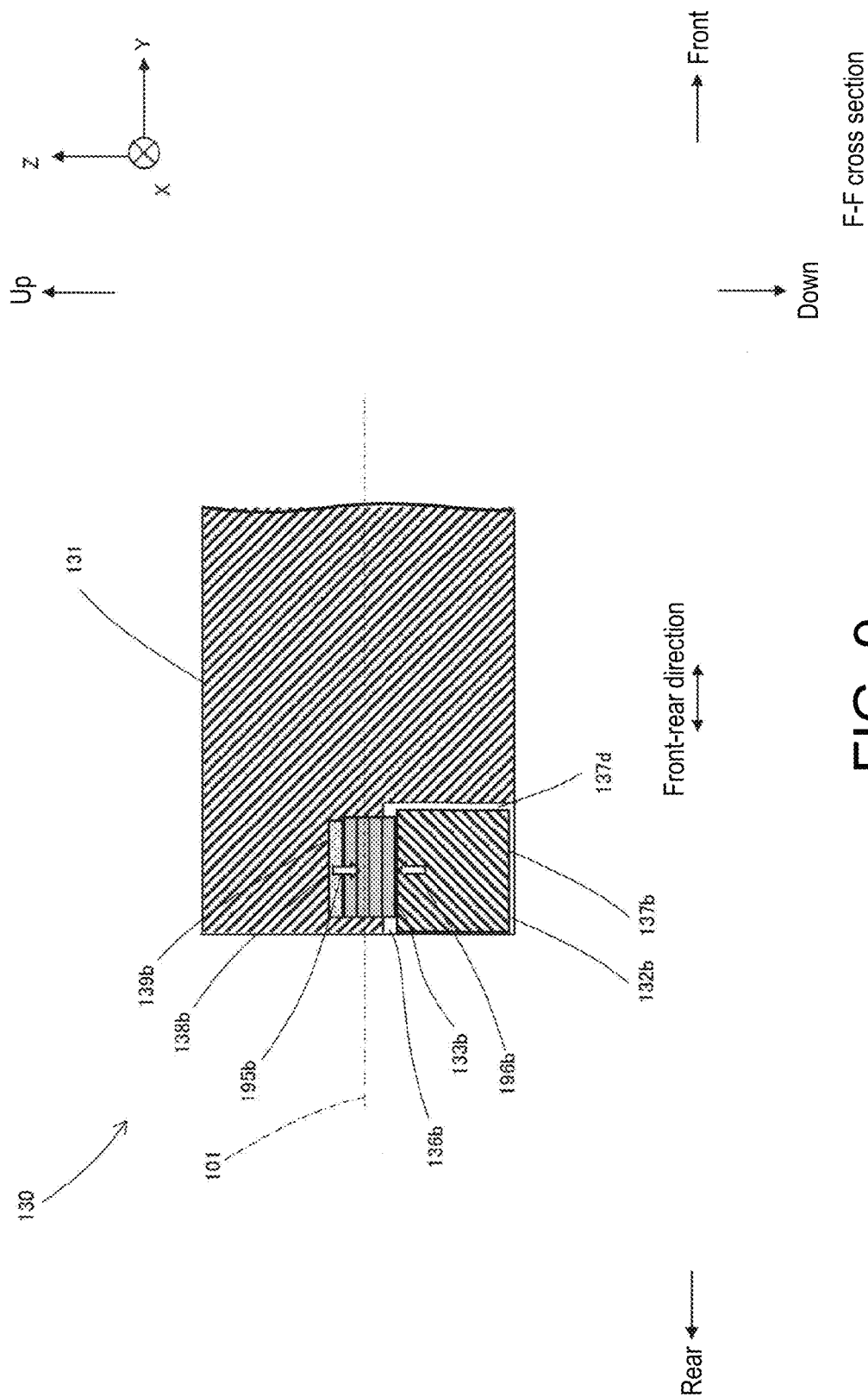
FIG. 9 is a longitudinal cross-sectional view of a torsional vibration generating portion of an ultrasonic horn according to another embodiment, and is F-F cross section shown in FIG. 7.

One vibration member 132a is a fan-shaped cross-sectional portion partitioned by the one horizontal slit 136a, the one vertical slit 137a, and the one fan-shaped slit 137c. The one vibration member 132a is connected to the rod-shaped body 131 at the central portion. Similarly, as shown in FIGS. 7 and 9, the other vibration member 132b is a fan-shaped cross-sectional portion partitioned by the other horizontal slit 136b, the other vertical slit 137b, and the other fan-shaped slit 137d, and is connected to the rod-shaped body 131 at the central portion.

As described above, the one horizontal slit 136a, the one vertical slit 137a, and the one fan-shaped slit 137c are arranged axisymmetrically with respect to the central axis 101 with the other horizontal slit 136b, the other vertical slit 137b, and the other fan-shaped slit 137d. Therefore, the one vibration member 132a and the other vibration member 132b are arranged axisymmetric with respect to the central axis 101.

Further, one recess portion 138a is provided on a surface of the rod-shaped body 131 facing the one vibration member 132a, and one second ultrasonic vibrator 133a is mounted in the one recess portion 138a such that the stacking direction, which is the vibration direction, is the circumferential direction. Moreover, one wedge 139a is inserted between the rod-shaped body 131 of the one recess portion 138a and the one second ultrasonic vibrator 133a so as to pressurize the one second ultrasonic vibrator 133a in the directions of arrows 195a and 196a. Similarly, on a surface of the rod-shaped body 131 facing the other vibration member 132b, the other recess portion 138b is provided and in which the other second ultrasonic vibrator 133b and the other wedge 139b are mounted so as to pressurize the other second ultrasonic vibrator 133b in the directions of arrows 195b and 196b.

Here, the one vibration member 132a, the one recess portion 138a, the one second ultrasonic vibrator 133a, and the one wedge 139a are arranged axisymmetrically with respect to the central axis 101 of the other vibration member 132b, the other recess portion 138b, the other second ultrasonic vibrator 133b, and the other wedge 139b.

The operation of the ultrasonic horn 200 is similar to the operation of the ultrasonic horn 100 described above, and by the ultrasonic vibration of a first ultrasonic vibrator 13 and ultrasonic vibration of the second ultrasonic vibrators 133a and 133b, the tip 52 of the capillary 51 mounted to the front end portion 21 of the horn portion 20 may be vibrated in two directions, the Y direction which is the front-rear direction and the X direction which is the lateral direction. As a result, as indicated by arrows 197 and 198, a torsional moment in the same direction around the central axis 101 is applied to the rod-shaped body 131 by the vibration of the pair of vibration members 132a and 132b in the circumferential direction.

Moreover, since in the ultrasonic horn 200, the vibration members 132a and 132b are each partitioned by the horizontal slits 136a and 136b, the vertical slits 137a and 137b, and the fan-shaped slits 137c and 137d, the number of parts can be reduced to form a simple structure.

Further, since the pressurization of the second ultrasonic vibrators 133a and 133b may be adjusted by the wedge 139a and the wedge 139b, the pressurization load can be freely adjusted, and the ultrasonic vibration of the second ultrasonic vibrators 133a and 133b can be stabilized.

Moreover, the one wedge 139a may be inserted between the one vibration member 132a and the one second ultrasonic vibrator 133a to pressurize the one second ultrasonic vibrator 133a. The same applies to the other wedge 139b.

Further, the one recess portion 138a in which the one second ultrasonic vibrator 133a is mounted may be provided not on the rod-shaped body 131 but on a surface of the one vibration member 132a facing the rod-shaped body 131. The same applies to the other recess portion 138b.

As a result, similar to the ultrasonic horn 100, the ultrasonic horn 200 can improve the bonding quality and the bonding strength of the wire bonding portion.

What is claimed is:

1. An ultrasonic horn, which is an ultrasonic horn used in a wire bonding apparatus, comprising:
   a vertical vibration generating portion in which a first ultrasonic vibrator is mounted inside such that a vibration direction is a front-rear direction;
   a horn portion extending forward from the vertical vibration generating portion, amplifying an ultrasonic vibration generated by the vertical vibration generating portion, and to which a bonding tool is mounted at a front end portion; and
   a torsional vibration generating portion extending rearward from the vertical vibration generating portion,
   wherein the torsional vibration generating portion comprises:
      a rod-shaped body extending rearward from the vertical vibration generating portion;
      a pair of vibration members arranged axisymmetrically around a longitudinal central axis of the rod-shaped body and having a mass smaller than the rod-shaped body;
      a pair of second ultrasonic vibrators axisymmetric around the longitudinal central axis of the rod-shaped body and sandwiched between the rod-shaped body and each of the vibration members such that a vibration direction is a circumferential direction; and
      a pair of pressurizing mechanisms respectively compressing each of the second ultrasonic vibrators sandwiched between the rod-shaped body and each of the vibration members and pressurizing each of the second ultrasonic vibrators.

2. The ultrasonic horn according to claim 1,
   wherein the rod-shaped body has a pair of notch portions formed axisymmetrically around the longitudinal central axis,
   each of the vibration members is a separate member from the rod-shaped body and is fitted into each of the notch portions, and
   the pressurizing mechanism is a bolt screwed into the rod-shaped body or the vibration member and compressing the second ultrasonic vibrator sandwiched between the rod-shaped body and the vibration member.

3. The ultrasonic horn according to claim 2, wherein the second ultrasonic vibrator is configured by stacking a plurality of piezoelectric elements that vibrate in a thickness direction when a high-frequency power is applied.

4. The ultrasonic horn according to claim 1, wherein each of the vibration members is a portion partitioned by slits provided axisymmetrically around the longitudinal central axis of the rod-shaped body and extending radially, and a part thereof is respectively connected to the rod-shaped body;

the pair of second ultrasonic vibrators are respectively arranged in each recess portion between the rod-shaped body and each of the vibration members; and the pressurizing mechanism is a wedge inserted between the second ultrasonic vibrator in the recess portion and the rod-shaped body or between the second ultrasonic vibrator and the vibration member.

5. The ultrasonic horn according to claim 4, wherein the second ultrasonic vibrator is configured by stacking a plurality of piezoelectric elements that vibrate in a thickness direction when a high-frequency power is applied.

6. The ultrasonic horn according to claim 4, wherein the rod-shaped body comprises:

a pair of horizontal slits formed from a rear end surface to a longitudinal center and extending radially outward horizontally from a central portion;

a pair of vertical slits formed from the rear end surface to the longitudinal center and extending radially outward, upward and downward from the central portion; and a pair of fan-shaped slits extending diagonally upward and diagonally downward from the central portion at the longitudinal center, wherein the pair of horizontal slits, the pair of vertical slits, and the pair of fan-shaped slits are provided axially axisymmetrically around the longitudinal central axis of the rod-shaped body, one vibration member is a portion partitioned by one horizontal slit, one vertical slit, and one fan-shaped slit and the other vibration member is a portion partitioned by the other horizontal slit, the other vertical slit, and the other fan-shaped slit; and the one vibration member and the other vibration member are each connected to the rod-shaped body at the central portion.

7. The ultrasonic horn according to claim 1, wherein the second ultrasonic vibrator is configured by stacking a plurality of piezoelectric elements that vibrate in a thickness direction when a high-frequency power is applied.

\* \* \* \* \*